United States Patent Office 3,051,197
Patented Aug. 28, 1962

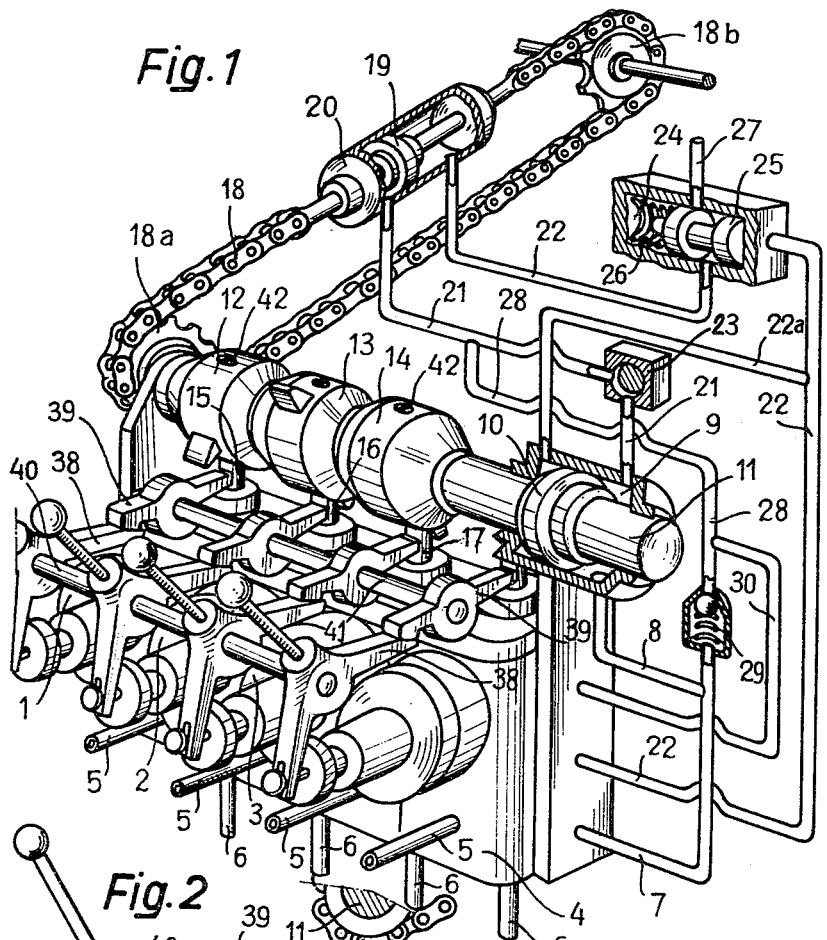

3,051,197
HYDRAULIC AUTOMATIC CONTROL DEVICE, MORE PARTICULARLY FOR MACHINE TOOLS
Giuseppe Zomer, 20 Via Montezemolo, Turin, Italy
Filed Nov. 14, 1960, Ser. No. 69,172
Claims priority, application Italy Mar. 16, 1960
5 Claims. (Cl. 137—622)

This invention relates to a hydraulic automatic control device, more particularly for machine tools.

An object of this invention is to provide a device which is fully automatic in operation and resumes its starting condition on completion of the working cycle, and wherein any stage of the working cycle can be held up at will or even excluded without any variation in the program setting.

A further object of this invention is to provide a device which is robust in construction and reliable in working, and in which the program setting is very easy to carry out.

The main characteristic feature of this invention resides in that the automatic control device comprises a plurality of valves for controlling a number of hydraulic circuits controlling the various motion of the machine composing the working cycle, means for operating said valves in a predetermined time sequence and restoring the device to its starting condition, including a shaft having a plurality of cams mounted thereon, a mechanism comprising a first hydraulic cylinder for axial movement in opposite directions of said shaft thereby to selectively bring said cams to their operative and inoperative positions, respectively, with respect to the valves, a second hydraulic cylinder for rotating said shaft, and means for excluding at will at least one of the operations composing said working cycle, the first and second mentioned hydraulic cylinders being operated by pressure fluid supplied by one valve of said number of valves acting as a sequence valve.

The valves each comprise a valve body having movable therein a stopped valve member, means for retaining said valve member in any of the operative positions to which it is moved against spring action and for reversing the valve member positions when the fluid pressure in the valve controlled circuit exceeds a present value, and selectively manually operable means for reversing the positions of said valve member independently of said fluid pressure value.

Further characteristic features and advantages will be understood from the following detailed description in which reference is made to the accompanying drawings, wherein:

FIGURE 1 is a diagrammatical perspective view showing a valve set composing the automatic control device, more particularly the hydraulic circuit adapted to control operation of the said automatic control device, FIGURE 2 is a middle vertical sectional view of the one valve out of the plurality of valves of the automatic control device, which is adapted to control operation thereof.

In the construction described hereafter by way of example, the automatic control device is arranged for a working cycle comprising three different operations.

The automatic control device comprises a set of four valves, three of which, denoted by 1, 2 and 3, respectively, are arranged for actuation in a manner known per se and in the desired sequence the hydraulic circuits (not shown) operating the members of a machine capable of accomplishing the various operations. The fourth valve, which is denoted by 4, controls operation of the automatic control device. The valve 4 shall be referred to hereafter as sequence valve.

The valves are fed from one or a plurality of pumps through oil supply conduits 5 and are provided with outlet pipings 6 connected with an oil reservoir not shown on the drawing.

The hydraulic circuit operating the automatic control device leads, as mentioned above, to the sequence valve 4 and comprises a delivery pipe 7, a branch 8 of which opens within a cylinder 9 having a piston 10 fast with a shaft 11 movable therein. The shaft 11 has keyed thereto cams 12, 13 and 14 adapted to act on the valve members 15, 16 and 17 respectively, of the valves 1, 2 and 3.

The shaft 11 is rotated by a sprocket chain 18 engaging sprocket wheels 18a, 18b, driven by a piston 19 movable in a stationary hydraulic cylinder 20, the sprocket wheel 18a being fast in rotation with the shaft 11, but capable of axial displacement thereto.

The cylinder 20 is subdivided by the piston 19 into two chambers connecting through a conduit 21 with the inside of the cylinder 9 and through a conduit 22 with the sequence valve 4, respectively. A throttle member 23 is interposed in the conduit 21 and an automatic valve is interposed in the conduit 22 and deflects the liquid returned through said conduit for discharge to a conduit 27 connected with a discharge reservoir (not shown). The automatic valve comprises a cylindrical chamber 24 having a piston 25 movable therein against the action of a spring 26.

A further conduit 28 is arranged in parallel with the conduit 21 and comprises a non-return valve 29 ahead which a further conduit 30 is branched which connects with the valve 4.

The valves of the automatic control device each comprise a valve body 31 having a reversing valve member 32 movable therein against the action of a spring 33. The vave member 32 is retained in its lowered position by a piston 34 biased by a spring 35 to snap its fore end into a notch 36 in the valve member 32. The piston 34 is moved against the action of the spring 35 in order to release the valve member 32 either by the force due to the overpressure within the liquid, or manually by means of a pull rod 37 actuated by a bell crank lever 38. The lever 38 cooperates with a rocker 39 adapted to displace the valve member 32 vertically. On clockwise or counterclockwise movement, the lever 38, FIG. 2, releases the piston 34 from the notch 36 or lowers the valve member 32 through the rocker 39, respectively.

The valves of the automatic control device are each provided with a manual control comprising a lever 38 and a rocker 39. The levers 38 are all rotatably mounted on a common shaft 40, the rockers 39 being all rotatably mounted on a common shaft 41.

Referring to the drawings the automatic control device operates as follows.

The cams 12, 13 and 14 are assumed to be staggered to one another through angles corresponding to the timing sequence of the operations composing the working cycle.

At first the piston 10 fast with the shaft 11 is displaced in the chamber 9 towards the right looking at FIG. 1. The automatic control device is started by displacing counterclockwise the lever 38 cooperating with the sequence valve 4. This results in the rocker 39 lowering the valve member 32 thereby to interconnect the delivery conduit 5 and conduit 7.

Oil flows through said conduit 7 and branch 8 to the chamber 9 and displaces the piston 10 to the left, thereby causing the cams 12, 13 and 14 to take their operative positions in front of the valve members 15, 16 and 17 of the valve set controlling the hydraulic circuits releasing the various operations. At the same time oil flows from the chamber 9 through the conduit 21 to the cylinder 20 and acts on the piston 19 to rotate the shaft 11 clockwise. During this step the oil in the chamber past the piston 19 is expelled from the cylinder and discharged through conduits 22 and 27 to the reservoir.

The conveniently adjustable throttle device 23 is extremely important in the above process, for the oil pressure ahead said throttle device, hence in the cylinder 9 raises more quickly than past said throttle device. The oil therefore acts to firstly displace the piston 10. When the piston reaches the end of its stroke (on the left looking at FIG. 1) the pressure tends to equalize ahead and past the throttle 23 and acts as mentioned above to displace the piston 19. By virtue of the throttle 23 the piston 10 moves at a considerably higher rate than the piston 19, inasmuch as the oil delivery so the cylinder 20 is decreased by the provision of the throttle 23.

The displacement of the piston 19 results in clockwise rotation of the shaft 11 through the action of the sprocket chain 18 on sprocket wheels 18a, 18b. The operative surfaces of the cams 12, 13 and 14 successively contact and lower the valve members 15, 16 and 17, thereby releasing the respective stages of the working cycle.

Each valve reverses automatically in a known manner the position of its valve member 32 on completion of the stage of the working cycle, which has been started by lowering of its member 32. For the valve 4 this occurs, for example, when the piston 19 reaches the bottom of the cylinder 20 chamber connected to the duct 22. In fact, stopping of the piston 19 causes an increase in pressure in the cylinder chamber connected with the duct 21. This pressure rise is transferred by the ducts 21, 28 and 30 on the piston 34 which will be pushed back against the action of the spring 35, thereby releasing the valve member 32 resting under the action of the spring 33 which urges said member towards its starting position in which the duct 7 communicates with the discharge conduit 6 and the duct 22 with the pump outlet duct 5.

When the piston 19 reaches the end of its stroke, the shaft 11 stops rotating. The oil in the chamber of the cylinder 20 ahead the piston 19 is subjected to an overpressure due to stoppage of the piston 19. The overpressure extends through the conduits 21 and 28 to the conduit 30 and acts on the piston 34 of the sequence valve 4 to release the piston from the notch 36 in the valve member.

The valve member is moved upwardly by the spring 33 and connects the delivery conduit 5 with the conduit 22. Oil is delivered through the conduit 22 to the cylinder 24 and through conduit 22a to the cylinder 9.

The piston 25 and spring 26 in the cylinder 24 cause the oil to act at first through conduit 22a on the piston 10 in the cylinder 9 to displace it to the right looking at FIG. 1, in order to displace the cams 12, 13 and 14 to other vertical planes than the planes containing the axes of the valve members 15, 16 and 17. As the piston 10 reaches the right-hand end of the cylinder 9, the pressure in the conduit 22 rises and displaces the piston 25 to connect the conduit 22 with the inside of the cylinder 20.

The oil now acts on the piston 19 to rotate the shaft 11 counterclockwise. This restores, as described above, the starting condition of the parts, so that the working cycle can be repeated by actuation of the lever 38 of the sequence valve 4.

In the position shown in FIG. 2, the valve is not locked against axial movement. It is partially lowered because of the action of the tooth of the member 12 fixedly connected to the shaft 11 on the tooth at the top end of the valve member 32. Locking of valve member 32 by the piston 34 will occur only when the reduced diameter tip of the piston 34 enters the notch 36 provided in the valve member 32. As long as this does not take place, the valve member 32 will be able to continue its downward movement under the action of the tooth of the body 12 rotating clockwise, since the reduced diameter end of the piston 34 is seated in a chamber of the valve member 32 having an axial dimension quite in excess of the diameter of said reduced diameter end of the piston 34.

Therefore, there is no need to effect any manual operation, such as moving the lever 38 (mounted idle on the rod 40) for lowering the valve member 32 and for locking it in its lowered position. In fact, the valve member will be engaged and locked by the reduced diameter projection of the piston 34 (spring-loaded by the spring 35) only after it has completed its downward movement which it effects under the pressure of the tooth-cam fixed on the member 12 rotatable with the shaft 11. The disengagement of the valve member 32 and its return towards the starting position take place under the action of the spring 33, after the piston has been moved backward against the action of the spring 35, due to the hydraulic thrust exerted on the piston 34 by the liquid incoming from the conduit 30.

Thus the valve member 32 automatically carries out its working cycle after having been moved downwards till the end of its stroke. The lever 38 may be manually actuated if it is desired for the valve to carry out its working cycle independently of the angular position of the shaft 11.

By manually oscillating a lever 38 counterclockwise or clockwise, the operating cycle controlled by the associated valve member 32 is started or stopped at will to limit or even exclude a step controlled by the associate valve member and without otherwise varying the program setting of the other valve members.

With the automatic control device according to this invention setting of the working cycle is extremely easy, inasmuch as during setting each of the individual steps can be manually controlled and the cams can be angularly adjusted by acting on set screws 42 connecting them to the shaft 11 to arrange for the desired timed sequence of the said operations.

What I claim is:

1. Hydraulic automatic control device comprising a plurality of control valves for controlling the operation of a number of hydraulic circuits, means for operating said valves in a predetermined time sequence and restoring the device, including a shaft having a plurality of cams mounted thereon, a mechanism comprising a first hydraulic cylinder for axially displacing said shaft and selectively displacing said cams to their operative and inoperative positions, respectively, a second hydraulic cylinder for rotating said shaft, and means for excluding the operation at will of at least one of the hydraulic circuits, said first and second hydraulic cylinders being actuated by pressure fluid supplied by a circuit controlled by a sequence valve out of said plurality of valves.

2. Device as claimed in claim 1, wherein the said first and second hydraulic cylinders each comprise a piston subdividing the cylinder into cylinder portions which are selectively connected by said sequence valve with a source of pressure fluid, reversal of said connections taking place automatically as a result of reversal of the positions of the sequence valve member when the fluid pressure in the selectively connected cylinder portions exceeds a predetermined value.

3. Device as claimed in claim 1, wherein at a first position of the sequence valve member the said first and second hydraulic cylinders are interconnected in series through the interposition of a member adapted to reduce the pressure of the fluid flowing through said circuit to said second hydraulic cylinder to cause said fluid to effect at said position of the sequence valve member a rotational movement of said shaft after a translational movement of said shaft caused by the pressure of the fluid flowing through said circuit to said first hydraulic cylinder, said shaft movements for moving the cams to their operative position.

4. Device as claimed in claim 2, wherein said first and second hydraulic cylinders comprises a parallel connection which at a second position of the sequence valve member feeds said cylinders to restore the device, the branch of said connection supplying said second hydraulic cylinder being provided with an intercepting device including a piston movable against spring action, which is displaced to interconnect said second cylinder with the pressure fluid source when the pressure of said fluid exceeds a predetermined limit, whereby at said second position of the sequence valve member the pressure fluid first axially displaces said shaft to move the cams away from said operative position and subsequently rotates the shaft back to its initial position.

5. Device as claimed in claim 1, wherein said second hydraulic cylinder drives a sprocket chain meshing with a pair of spaced apart sprocket wheels, one sprocket wheel being fast on said shaft for rotation therewith.

References Cited in the file of this patent

UNITED STATES PATENTS

| | | |
|---|---|---|
| 851,723 | Wolf | Apr. 30, 1907 |
| 1,317,588 | Nordstrom | Sept. 30, 1919 |
| 2,823,698 | Larison | Feb. 18, 1958 |
| 2,946,346 | Mead | July 26, 1960 |

FOREIGN PATENTS

| | | |
|---|---|---|
| 494,295 | Great Britain | Oct. 19, 1938 |